United States Patent [19]

Chapman et al.

[11] 4,331,631

[45] May 25, 1982

[54] ENHANCED OXIDE WHISKER GROWTH ON PEELED Al-CONTAINING STAINLESS STEEL FOIL

[75] Inventors: Lloyd R. Chapman, St. Clair Shores; Charles W. Vigor, Rochester; John F. Watton, Mt. Clemens, all of Mich.

[73] Assignee: General Motors Corporation, Detroit, Mich.

[21] Appl. No.: 98,075

[22] Filed: Nov. 28, 1979

[51] Int. Cl.$^3$ .................... F01N 3/10; C23C 11/08; B01J 21/04; B01J 35/02
[52] U.S. Cl. .................... 422/180; 148/6.3; 148/31.5; 252/465; 252/477 R
[58] Field of Search .................... 252/465, 477 R; 148/6.3, 31.5; 422/180

[56] References Cited

U.S. PATENT DOCUMENTS

| | | | |
|---|---|---|---|
| 3,920,583 | 11/1975 | Pugh | 252/465 |
| 3,957,692 | 5/1976 | Cairns et al. | 252/465 |
| 3,969,082 | 7/1976 | Cairns et al. | 422/180 |
| 4,096,095 | 6/1978 | Cairns | 252/465 |
| 4,196,099 | 4/1980 | Hunter et al. | 252/477 R |

OTHER PUBLICATIONS

Tien et al., "Mechanism of Oxide Adherence on Fe-25-Cr-4Al (Y or Sc) Alloys", *Metallurgical Transactions,* vol. 3, Jun. 1972, pp. 1587-1599.

*Primary Examiner*—W. J. Shine
*Attorney, Agent, or Firm*—Douglas D. Fekete

[57] ABSTRACT

In the preferred embodiment, a method is disclosed for preparing a metal foil composed of a ferritic stainless steel alloy and having a surface that is substantially covered by high aspect alumina whiskers. The preferred foil alloy comprises 15 to 25 weight percent Cr, 3 to 6 weight percent Al, 0.3 to 1.0 weight percent Y and the balance Fe. The method comprises forming the foil by a metal peeling process and treating the foil by heating in air at a temperature between about 870° C. and about 930° C. for a time sufficient to grow the alumina whiskers. In a particularly useful embodiment, the whisker-covered foil is coated with a noble metal-impregnated alumina layer and wound into a suitable cylindrical structure for use as a monolith-type catalytic converter for automotive exhaust gas treatment.

21 Claims, 12 Drawing Figures

ENHANCED OXIDE WHISKER GROWTH ON PEELED Al-CONTAINING STAINLESS STEEL FOIL

BACKGROUND OF THE INVENTION

This invention relates to the manufacture of a monolith-type automotive catalytic converter comprising a wound foil structure formed of a heat resistant Al-containing ferritic alloy foil carrying a catalyst-bearing alumina coating. More particularly, this invention relates to preparing an Fe-Cr-Al-Y foil to bond with improved adhesion an alumina coating, which coated foil is suitable for forming a monolith-type catalytic converter.

Monolith catalytic converters are known for treating automotive exhaust gases to reduce noxious emissions. The monolith converter typically comprises an extruded ceramic cylindrical structure having a plurality of square axial passageways in a cross-sectional honeycomb pattern. The passageway surfaces bear the noble metal catalyst, such as a Pt/Pd/Rh mixture, which catalyst interacts with exhaust gas caused to flow therethrough. A similar converter structure is formed of cold rolled metal foil having a catalyst-impregnated ceramic coating. The foil is corrugated and wound into a cylindrical structure wherein the corrugations form gas-conducting passageways. When compared to the monolith, the wound foil structure features substantially thinner walls, which permits an increase in the catalyst-bearing surface area per unit volume, thereby improving the converter efficiency.

The foil for the converter is suitably composed of a high temperature corrosion-resistant, Al-containing ferritic alloy. A preferred alloy consists of, by weight, 15 to 25% chromium (Cr), 3 to 6% aluminum (Al), 0.3 to 1.0% yttrium (Y) and the balance iron (Fe). The alloy, which is conveniently designated Fe-Cr-Al-Y, is readily commercially available as cold-rolled foil. The foil is typically pretreated by heating in air at 1000° C. for between 1 to 24 hours to form a thin, tightly adherent oxide surface layer which protects the underlying alloy from further oxidation during high temperature use. The protective layer is composed predominately of alpha alumina, but also contains a small amount of yttrium oxide, which improves the adhesion of the oxide layer to the alloy substrate. When viewed with a scanning electron microscope, the surface of the protective layer is substantially flat or may comprise slight nodules.

The protective oxide layer is not satisfactory for carrying the catalyst. Therefore, the oxidized foil is coated with an aqueous alumina dispersion and fired to form a high surface area gamma-alumina coating, which is impregnated with the catalyst. The applied alumina coating provides a large number of suitable catalyst metal sites and also reduces the detrimental effects of some exhaust gas constituents upon the catalyst performance.

When the wound foil converter is incorporated into an automobile exhaust system for treating exhaust gas, the catalyst-bearing coating tends to spall. The spalling problem is fundamentally related to poor adhesion of the applied alumina coating to the protective oxide layer. Adhesion is poor partly because the smoothness of the protective layer surface does not enable it to satisfactorily grip or anchor the applied coating. Thus, the coating breaks off when the converter is subjected to mechanical vibration and cyclic temperature operation, conditions typically encountered during its automotive use. Cycling between ambient and exhaust gas temperatures is particularly detrimental because of the difference in thermal expansion between the alloy and the alumina coating. The overall result is that the coating spalls and converter performance is impaired.

Therefore, it is an object of this invention to provide an improved monolith-type automotive catalytic converter formed of a metal foil of an Al-containing ferritic stainless steel alloy, which foil is covered by a protective oxide surface layer and an overlying catalyst-bearing alumina coating. The coating exhibits improved resistance to spalling. The protective oxide layer is formed of densely spaced protruding crystalline whiskers that substantially cover the alloy surface and tightly bond the applied coating.

It is a further object of this invention to provide a foil composed of an Fe-Cr-Al-Y alloy or a similar Y-free alloy and formed by a metal peeling process, which foil surface is substantially covered by a corrosion-protective oxide made up of densely spaced protruding crystalline whiskers. The whisker-covered surface is adapted to bond with improved adhesion a ceramic or other coating applied thereto. In one particularly useful aspect of this invention, a catalyst-impregnated alumina coating is applied to the whisker-covered foil to produce a spall-resistant coated foil suitable for manufacturing a monolith-type catalytic converter.

It is also an object of this invention to provide a method of producing a metal foil formed of an Fe-base alloy containing Al and Cr and capable of being coated with improved adhesion, which method comprises oxidizing severely cold worked foil by heating in an oxygen-containing atmosphere to form on the surface thereof an oxide layer substantially made up of protruding whiskers.

It is a more particular object of this invention to provide a method of preparing a metal foil to receive a coating with improved adhesion, which method comprises forming by a metal peeling process a foil of an Fe-base alloy containing Cr, Al and preferably Y and treating the peeled foil by heating at a specific temperature range in the presence of oxygen to grow a tightly-adherent protective oxide layer comprising high aspect oxide whiskers. The whiskers substantially cover the foil surface and improve the bonding of a subsequently applied coating. In one aspect of this invention, the whisker-covered Fe-Cr-Al-Y foil is coated with an alumina-base coating and is used to manufacture a monolith-type catalytic converter having improved spall resistance.

BRIEF SUMMARY OF THE INVENTION

In the preferred embodiment, these and other objects are accomplished by manufacturing an Fe-Cr-Al-Y alloy foil by a metal peeling process and subjecting the peeled foil to an oxidation treatment to form on the surface a tightly-adherent protective oxide layer comprising densely spaced protruding oxide whiskers. The preferred alloy consists essentially of 15 to 25 weight percent Cr, 3 to 6 weight percent Al, 0.3 to 1 weight percent Y and the balance Fe. A generally cylindrical billet of the alloy is rotated while an axially oriented cutting tool is fed into the peripheral surface to continuously peel therefrom a thin metal strip. As it is peeled, the strip is pulled away from the billet surface under controlled tension to form the foil which has irregular and severely cold-worked surfaces. The peeled foil is thereafter heated in a free oxygen-containing gas, preferably air, to grow oxide whiskers on the foil surface. Oxidation at a temperature between about 870° C. to about 930° C. for eight hours or longer substantially covers the foil surface with a protective layer made up of preferred high aspect oxide whiskers, that is, whiskers having a large height to width ratio. The resulting mountainous whiskers topography of the oxide layer on the peeled and treated Fe-Cr-Al-Y foil of this invention is capable of bonding a subsequently applied coating with improved adhesion. A preferred application of the whisker-covered foil is in the manufacture of a monolith-type automotive catalytic converter having improved spalling resistance. The foil is corrugated and wound into a suitable cylindrical structure. An alumina-base coating is applied to the whisker-covered surface and impregnated with a noble metal catalyst. The resulting coated foil structure is suitably incorporated into an automotive exhaust system for treating exhaust gases.

It is a significant feature of the preferred embodiment that the oxide whiskers are grown on peeled metal foil. While not wishing to be limited to any particular theory, the intense plastic deformation of the metal by the cutting tool is believed to produce numerous dislocation-type defects in the metal structure, including a dense population of said defects at the foil surface. The surface metal defects create structural defects in the oxide layer initially forming on the foil. Under suitable conditions, these oxide defects form easy diffusion paths through the initial oxide layer along which alloy-derived aluminum ions rapidly migrate to the surface. The resulting defect-localized build-up of aluminum oxide at the surface forms the subject whiskers. Because of the dense surface defects, the peeled foil, when suitably treated, is substantially covered with the oxide whiskers. In marked contrast, conventional cold-rolled Fe-Cr-Al-Y foil has relatively few surface defects and thus forms a noticeably smoother oxide topography when heated in air. Even when subjected to the preferred whiskers growing oxidation treatment of this invention, cold-rolled foil exhibits only occasional whisker formations, if any.

After treatment, both surfaces of the peeled foil are preferably covered with high aspect oxide whiskers. However, a difference is microscopically observable in the whisker topography on the opposite sides, which difference is believed to be related to the metal peeling process. During metal peeling, the metal adjacent the cutting tool is deformed in tension, whereas the free surface remote from the cutting tool is formed by compressive forces. This difference in the metal working results in a difference in the nature of the surface defects and thereby a difference in the whisker growth. It has been found that substantially larger whiskers grow on the compressive surface as compared to the tensive surface. The tensive surface features more of the individually smaller blades per unit area and both surfaces are substantially covered with high aspect whiskers. Despite the microscopic differences in their appearance, the whiskers grown on both surfaces are able to satisfactorily bind an applied coating and improve adhesion in comparison to a smooth oxide topography.

Whisker growth is also related to the temperature at which the foil is treated and to the treatment time. For the preferred alloy containing yttrium, high aspect whiskers are formed by heating in air between about 870° C. to about 930° C. Treatment for a minimum of about 8 to 12 hours is sufficient to cover the foil surface, with longer times resulting in generally larger whiskers. Although high-aspect whiskers are preferred for improving coating adhesion, suitable whisker topographies are formed by oxidizing at about 950° C. to about 850° C. or less for at least one-half hour or longer depending on the temperature. At oxidation temperatures greater than about 950° C., no whisker growth occurs and the resulting oxide layer is smooth. This temperature limitation is attributed to the presence of yttrium. Whisker growth at temperatures above 950° C. is possible for similar alloys that do not contain yttrium.

It is not necessary that the whiskers by grown ab initio from a bare metal surface. The whiskers are suitably formed although the surface was first slightly oxidized at temperatures lower than the temperatures which are considered conducive to whiskers growth. Thus, the peeled foil may be annealed in air and conveniently handled before being treated.

In a particularly preferred embodiment of this invention, the preferred whisker-covered peeled Fe-Cr-Al-Y foil is coated with an alumina layer, which is then impregnated with a noble metal catalyst. The resulting foil is suitably wound to form a monolith-type catalytic converter for automotive use. The roughness of the whiskered surface of the protective oxide layer substantially improves adhesion of the coating and overcomes spalling problems encountered with oxide layers having typical smooth or nodular surfaces. Also, the whisker topography is capable of carrying a thicker coating having ample catalyst sites. In addition to the advantages of whiskers, this invention also provides the economic and other advantages associated with metal peeling to form this foil.

DETAILED DESCRIPTION OF THE INVENTION

In the preferred embodiment, the whiskercovered peeled Fe-Cr-Al-Y foil of this invention is used to construct a monolith-type catalytic converter for treating automotive exhaust gases. The preferred alloy consists of 15 weight percent Cr, 4 weight percent Al, 0.5 weight percent Y and the balance Fe and is commercially known under the trade designation Fecralloy. The alloy is characterized by a ferritic matrix and a dispersed phase consisting of $YFe_9$ intermetallic compound. The bulk alloy for peeling is shaped as a hollow cylindrical billet about 7.6 cm in length. The billet length determines the foil width and is preferably at least the desired length of the wound foil structure.

Figure 1:
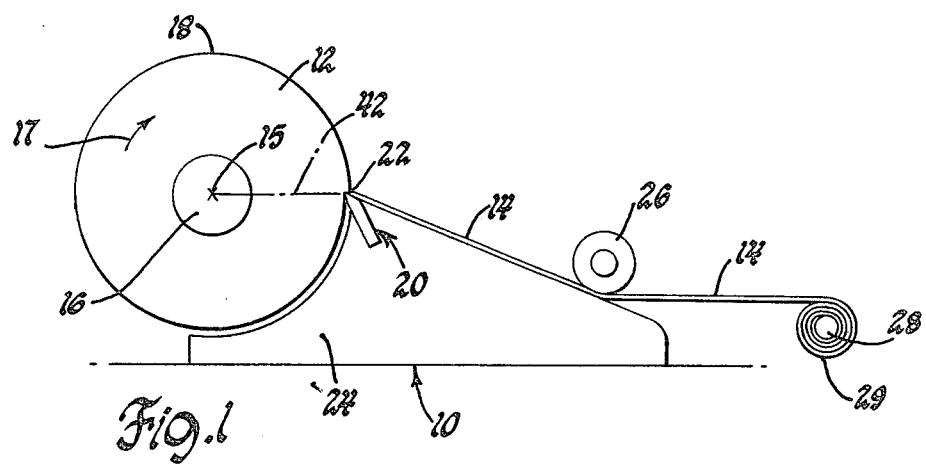
FIG. 1 is a cross-sectional view of the apparatus for peeling metal to produce foil.

Referring to FIG. 1, there is illustrated a machine, indicated generally at 10, for peeling Fe-Cr-Al-Y alloy from a generally cylindrical hollow billet 12 to form a foil 14. The billet is securely fitted about a motor-rotated spindle 16. During peeling, billet 12 is rotated about axis 15 by spindle 16 clockwise as indicated by Arrow 17. The spindle rotation is controlled to maintain a constant speed for uniform cutting of about 110 meters per minute at the billet outer surface 18. To maintain the constant cutting speed, the rotation is increased as necessary to compensate for the decreasing billet diameter that occurs as metal is peeled from surface 18. Spindle 16 is mounted in a stable, accurate position to prevent irregular movements that produce chatter or a wavy strip. When peeling large billets, billet 12 and spindle 16 are preferably cooled to maintain close dimensional tolerances and thereby more closely regulate the peeling operations. Cooling typically includes flooding or spraying a suitable fluid onto billet outer surface 18.

A hard tungsten carbide cutting tool 20 having a knife edge 22 is securely mounted in a tool holder 24 so that knife edge 22 lies parallel to billet outer surface 18. Tool holder 24 is horizontally movable by a suitable controlled driving means (not shown) to advance cutting tool 20 generally towards the spindle 16. During metal peeling, holder 24 advances cutting tool 20 and presses knife edge 22 into billet surface 18. The advancing speed of holder 24 and thus of knife edge 22 is maintained at 0.0030 cm (0.0012 inch) per revolution of billet 12. Since the billet revolution is varied to maintain a constant surface speed, the linear advance of holder 24 with respect to time is similarly varied to control the advance of knife edge 22. After cutting, foil 14 is pulled away from billet surface 18 at a predetermined angle and about guide roller 26.

Peeling apparatus 10 also includes a motor-driven windup mandrel 28 for collecting peeled foil 14 into a coil 29 for ready handling. The tension applied by mandrel 28 to peeled foil 14 is about 4220 kg per square cm (about 60,000 psi) on the peeled foil. The foil thickness depends upon the strip tension and the cutting tool advance and is about 0.0051 cm (0.002 inch). This tension also corresponds to a strip speed of about 61 meters per minute (200 feet per minute). As foil 14 is coiled onto motor-rotated windup mandrel 28, the rotating speed of mandrel 28 is controllably varied to smoothly collect foil 14 fed at a constant linear speed.

Additional details concerning the equipment and process for peeling the metal foil in the practice of this invention may be obtained by reference to U.S. Pat. No. 3,355,971, "Method of Producing Metal Strips", issued to Vigor on Dec. 5, 1967; U.S. Pat. No. 3,460,366, issued to Musial et al. on Aug. 12, 1969; and U.S. Pat. No. 3,603,186, issued to Vigor et al on Sept. 7, 1971.

Figure 2:
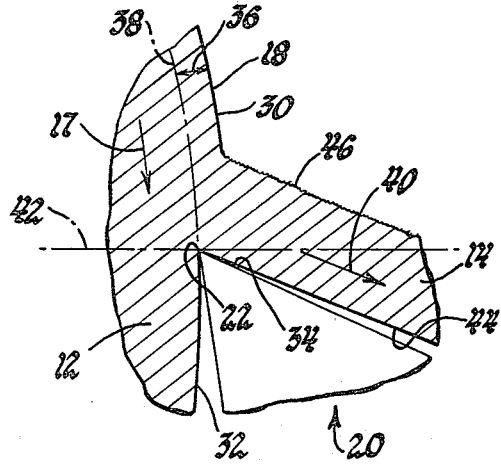
FIG. 2 is an enlarged view of part of FIG. 1 depicting the metal peeling process and the resulting peeled foil.

The metal peeling operation is also depicted in FIG. 2, wherein like characters to FIG. 1 represent the same or corresponding elements. In FIG. 2, billet surface 18 is depicted as a precut surface 30 and a freshly cut surface 32, which obviously becomes surface 30 after one revolution of billet 12. As knife edge 22 cuts into billet surface 30, rake face 34 plastically shears metal at a predetermined rate to form a chip. The rate at which metal is sheared is controlled by regulating the depth of the cut, shown in FIG. 2, as the radial distance 36 between surface 30 and phantom line 38 representing the knife edge path. In this embodiment, the cutting depth 36 was 0.0030 cm and is equivalent to the advance of tool 20 per billet revolution. Foil 14 is formed by pulling the sheared chip over rake face 34 at a predetermined angle and with a predetermined force. In FIG. 2, the chip is pulled in the direction indicated by Arrow 40 at an angle of 38° to the billet radius 42 intersecting knife edge 22. The pulling force is applied to foil 14 by the windup mandrel 28 and is about 4220 kg per square cm. Under these conditions, the peeled foil 14 is approximately 0.0051 cm thick.

A significant feature of this invention results from differences in the plastic deformation forces encountered during metal peeling. The foil surface 44 formed adjacent the rake face 34 is deformed by tensive forces created by shearing the metal along knife edge path 38. In contrast, foil surface 46 formed remote from tool 20 is deformed as a free surface under compression. That is, generally, the metal at billet surface 30 is compressively formed into foil surface 46 and the metal along knife edge path 38 is tensively formed into foil surface 44. The compressive deformation is more severe. As discussed herein, this difference significantly affects the subsequent oxide whisker growth.

In accordance with this preferred embodiment, the peeled foil is processed to form a monolith-type converter. The peeled foil is cleaned to remove any residual cooling fluid, for example, with a solvent such as oleum (petroleum naptha 395) followed by a methanol-ethanol rinse. The cleaned foil is annealed for one minute at 900° C. in air. Annealing substantially enhances the ductility of the peeled foil to render it more readily workable during subsequent converter-forming operations. Some oxidation of the peeled foil surface may occur during the very brief annealing treatment. However, annealing is preferably too brief to form the oxide whiskers of this invention. Also, it has been found that any oxidation that occurs during this annealing does not significantly deter subsequent whisker growth, even though carried out at temperatures that would not allow whisker growth.

To form the preferred converter support, the annealed peeled foil is corrugated by passing between a pair of driven rollers having mated teeth having a pitch of 0.18 cm and a height of 0.076 cm. The teeth are placed in a zigzag pattern on the roller surface to form a zigzag or herringbone corrugation pattern. The teeth were angled 10° with respect to the roller longitudinal axis to form corrugations displaced 10° from perpendicular to the foil edge. During corrugation, a typical light metal working lubricant is applied to the foil, which is subsequently cleaned away using a solvent, such as, trichlorotrifluoroethane.

Figure 4:
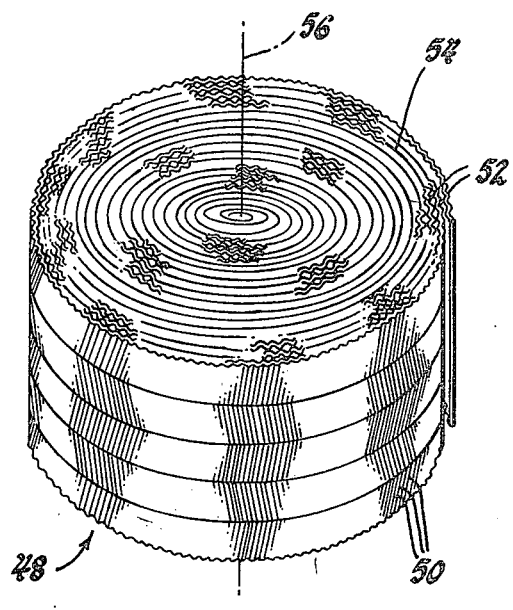
FIG. 4 is an elevational perspective view of a wound foil structure of a monolithtype automotive catalytic converter.

The corrugated peeled foil is then formed into the monolith-type structure. A strip about 18 m (60 feet) long is bent in half so that the semistrips lie parallel but the corrugations do not mate. That is, the foil is bent crest-to-crest and the troughs form open passages. The bent foil is coiled is a similar manner without mating the corrugations to form the desired cylindrical structure, shown generally at 48 in FIG. 4. The preferred foil structure is about 7.6 cm (3.0 inch) long and 12.7 cm (5.0 inch) in diameter, corresponding to a volume of about 969 cubic centimeters (60 cubic inches). As seen in FIG. 4, the foil corrugations 50 form the longitudinal gas-conveying passageways 52. There are preferably about 450 passageways per square inch of the foil structure ends, generally at 54. In comparison to the direction of the longitudinal axis 56 of structure 48, the passageways 52 are at an angle of 10°. It is noted that the product catalytic converter of this embodiment is substantially the same shape as structure 48 and that the remaining processing steps principally affect the foil surface.

Figure 7:
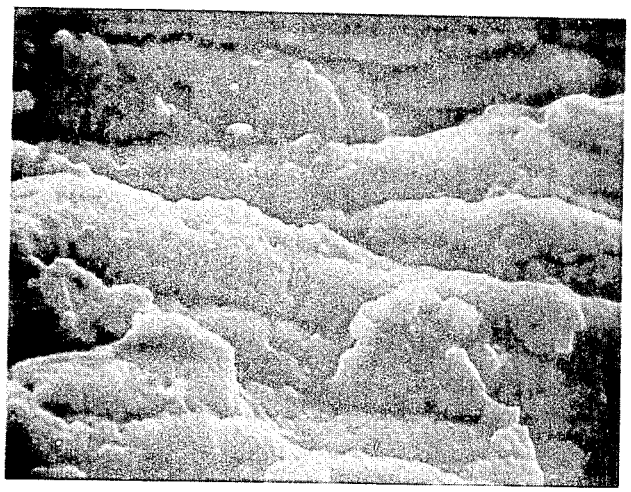
FIG. 7 is a photomicrograph taken using a scanning electron microscope and showing, at 5000× magnification, the unoxidized compressive surface of peeled Fe-Cr-Al-Y foil.
Figure 8:
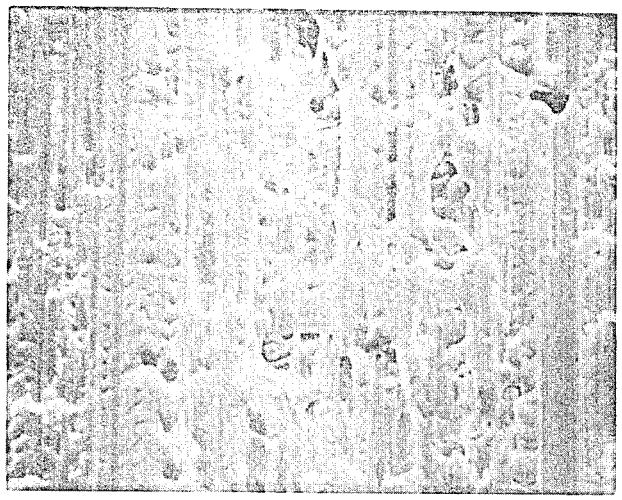
FIG. 8 is a photomicrograph taken using a scanning electron microscope and showing, at 5000× magnification, the unoxidized tensive surface of peeled Fe-Cr-Al-Y foil.

The coiled foil is then treated to form the surface oxide whiskers of this invention. The foil is uncoiled slightly to reduce metal-to-metal contact and positioned within a furnace having a circulating air atmosphere. The peeled foil is heated at 900° C. for twenty-four hours to grow the preferred oxide whiskers. The resulting whiskers are shown magnified in FIGS. 5 and 6. For comparison, the surfaces are shown prior to the whisker-growth in FIGS. 7 and 8. The surface in FIG. 7 was compressively formed and is represented by numeral 46 in FIG. 2. The resulting oxide, shown in FIG. 5, comprises relatively large individual whiskers, randomly oriented and substantially covering the surface. The tensively formed surface is represented by numeral 44 in FIG. 2 and pictured in FIG. 8. The oxide whisker growth is shown in FIG. 6 and comprises smaller and more uniformly oriented individual crystals than those formed on the compressive surface. These smaller whiskers also substantially cover the surface. The difference in the whisker growth is believed to be directly related to the difference in deformation forces during metal peeling.

The whiskered surface is coated with a gamma alumina material applied as a particle-containing gel. The gel is prepared by adding about 3.0 weight percent colloidal alpha alumina monohydrate $Al_2O_3.H_2O$ to water and stabilizing the mixture by adding nitric acid $HNO_3$ to adjust the pH to about 2.0, which requires about 5 ml of acid per 100 ml water. To the resulting thixotropic gel are added gamma alumina particles. The preferred gamma alumina particles have a porosity greater than about 1 cc pores per gram and a surface area greater than about 100 square meters per gram. About 70% of the particles are sized less than 200 mesh and greater than 325 mesh and the remaining particles are smaller than 325 mesh. The quantity of particles mixed with the gel is sufficient to make the resulting alumina content about 90% by weight gamma alumina and about 10% by weight gel-derived alumina. That is, to a gel containing about 3.0 g (3.0 weight percent) alpha alumina monohydrate per 100 ml are added 27 g gamma alumina particles.

The alumina gel material is preferably applied by spraying onto the whisker-covered foil surface. To provide spray access to the surface, the foil structure is unwound after the whisker-growing furnace treatment. A primer coat of the aforementioned acid-stabilized alumina gel without the gamma alumina particles is preferably first applied to the foil surface as thick as possible without running or dripping. Before the primer dries, a first coat of the particle-containing gel is applied. The alumina coating is air dried until turning white, typically about fifteen minutes. Faster drying is obtainable with the aid of a hot air blower. The resulting coating is approximately 15 microns thick. A second and a third coating of the particle-containing gel is applied and dried in the same fashion. The resulting coating is 40 to 50 microns in thickness.

The foil carrying the air dried alumina coating is rewound for convenient handling and then calcined for four hours at 550° C. in air. Precautions are necessary to remove the noxious $NO_2$ fumes produced as the acid is decomposed during calcining.

The gamma alumina coating is impregnated with the noble metal catalyst. A catalyst-containing solution of 250 ml is prepared by volumetrically dissolving about 1.4 g tetraamineplatinum(II) chloride, 0.76 g tetraminepalladium(II) chloride and 0.22 g pentaaminerodium(III) chloride in water. These amine complex weights correspond to about 0.8 g (0.025 troy ounces) Pt, 0.3 g (0.01 troy ounces) Pd and 0.08 g (0.0025 troy ounces) Rh. The entire 250 ml solution is applied evenly over the foil by uncoiling the structure and passing the alumina-coated foil between sponge pads onto which the noble metal solution is metered at the desired rate. The wet coating is dried by passing the strip between hot air guns. The dried foil is wound into the cylindrical structure and calcined for four hours at 550° C. in an atmosphere consisting of 4% by volume hydrogen and 96% nitrogen. Calcining destroys the amine complex salts and reduces the noble metals to their elemental state.

The peeled foil structure bearing the catalyst-impregnated coating is suitable for treating automotive exhaust gases. Two tightly coiled foil structures are coaxially arranged within a suitable housing that is part of the automotive exhaust system. Exhaust gases flow through the zigzag passageways in the foil structures, which brings them into contact with the noble metal catalyst to effect the desired reactions. As a result of the whiskers of this invention, adhesion of the alumina coating to the alloy foil is substantially improved, as evidenced by reduced spalling of the coating during use. The whiskers are also directly responsible for another significant advantage of the preferred monolith-type converter. In the preferred embodiment, the gamma alumina coating was between 40 to 50 microns thick. This is substantially thicker than the conventional 10 micron coating and is believed to enhance the resistance of the converter to lead compounds or other poisonous species in the exhaust gas. Thus, the improved monolith-type converter comprising the whiskers features better adhesion of a thicker gamma alumina coating.

In the preferred embodiment, the whiskers are grown on the severely cold-worked surfaces of the peeled Fe-Cr-Al-Y foil by heating the foil in air at 900° C. for twenty-four hours. X-ray analysis and analysis by Secondary Ion Mass Spectroscopy has demonstrated that the whiskers are essentially alpha alumina crystals. Yttrium, chromium and iron are present only at trace amounts significantly less than 1%. From scanning electron photomicrographs, such as those in FIGS. 5 and 6, it was determined that the preferred whiskers are on the order of three microns high and are high aspect, that is, the ratio of the whiskers height to the whiskers width is significantly greater than 1. A whisker-covered surface was also evaluated by BET surface area analysis. Although the particular whisker surface was not the preferred, it exhibited a surface area about 12 times greater than the geometric area. For comparison, the surface area of conventional oxidized foil is about 3 times greater than the geometric area, or about 4 times less than the whisker-covered surface. It is believed that the surface area of the preferred whisker-covered foil is even greater than these test results.

Figure 5:
FIG. 5 is a photomicrograph taken at 5000× magnification using a scanning electron microscope and showing the oxide whiskers formed on the compressive surface of peeled Fe-Cr-Al-Y foil that was oxidized for twenty-four hours at 900° C. in air.
Figure 6:
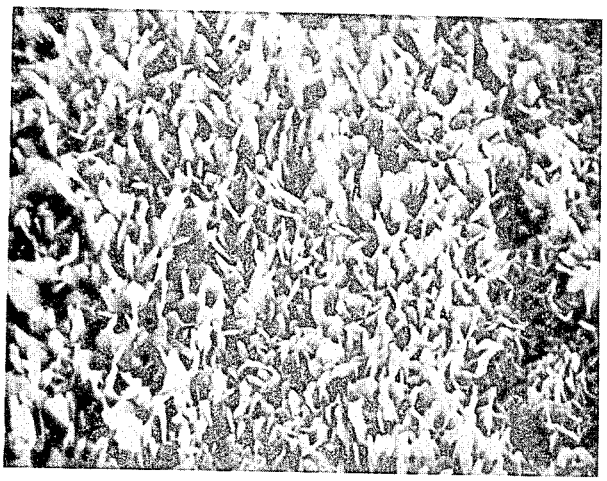
FIG. 6 is a photomicrograph taken at 5000× magnification using a scanning electron microscope and showing the oxide whiskers formed on the tensive surface of peeled Fe-Cr-Al-Y foil that was oxidized for twenty-four hours at 900° C. in air.

The most definitive method for determining the presence of oxide whiskers on the Fe-Cr-Al-Y foil surface is by a scanning electron microscope, as shown in FIGS. 5 and 6. However, the whisker-covered surface is detectable by other techniques. In preparing a sample for the scanning electron microscope, a gold coating is conventionally applied by vapor deposition to the sample surface. When gold coated, the whisker-covered surface appears velvety black, in marked contrast to the typical gold color exhibited by metallic or conventional oxidized foil. Further evidence of the preferred whiskers is readily obtained by applying adhesive tape, such as masking tape, to the surface. The tape is readily peeled off conventional oxidized foil, but bonds substantially harder to the whisker-covered surface and typically tears when being removed. Also, the mark of a felt-tipped pen on the whisker-covered surface tends to diffuse outwardly to form a blotch, in contrast to the neat mark left by the pen on conventional oxidized foil.

Figure 9:
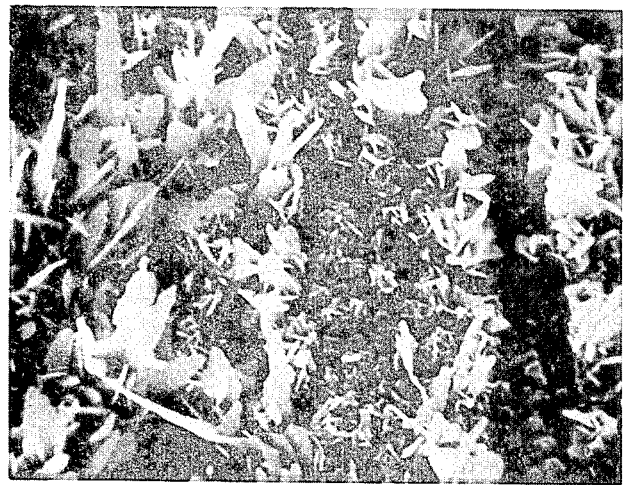
FIG. 9 is a photomicrograph taken using a scanning electron microscope and showing, at 5000× magnification, the oxide whiskers formed on cold-rolled Fe-Cr-Al-Y foil that was oxidized for twenty-four hours at 900° C. in air.

It is an essential feature of the preferred embodiment of this invention that the oxide whiskers form on peeled foil. Both the tensive and compressive surfaces of the peeled foil have a high density of metal structure defects that provide suitable sites for whisker growth. No special pretreatment other than cleaning is necessary. Good whisker growth is found even though the foil is pretreated under conditions not conducive to whisker growth, such as the initial annealing treatment in the preferred embodiment. In contrast, the same whisker growth does not occur with commercially acceptable cold-rolled Fe-Cr-Al-Y foil, even when subjected to the preferred oxidation treatment. FIG. 9 shows an oxide layer formed on the cold-rolled Fe-Cr-Al-Y foil heated in air at 900° C. for twenty-four hours without any special pretreatment. The cold-rolled surface in FIG. 9 is typical of commercially obtained foil. In this experiment, only occasional, randomly oriented whisker crystals are formed, which are separated by smooth areas of conventional nodular oxide.

Figure 10:
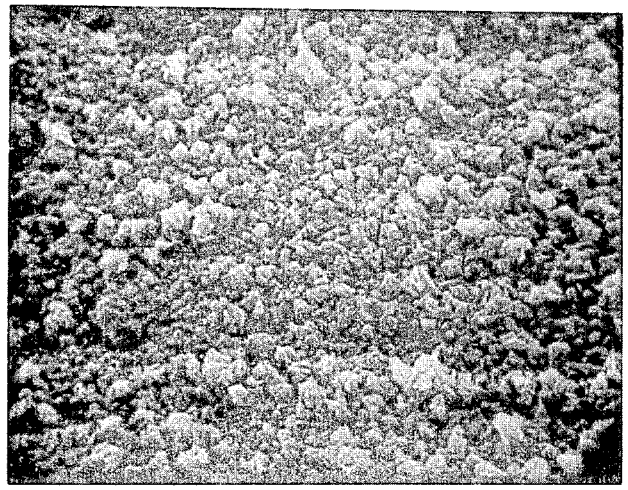
FIG. 10 is a photomicrograph made using a scanning electron microscope and showing, at 5000× magnification, the oxide surface formed on the tensive surface of peeled Fe-Cr-Al-Y foil which has been oxidized for four hours at 975° C. in air.

Oxide whisker growth is also fundamentally related to the oxidation temperature and the time at said temperature. The relationship between whisker growth and the oxidation condition is generally depicted for the yttrium-containing alloy in FIG. 3. Significantly, no whisker growth is observed for yttrium-containing alloy oxidized at a temperature greater than about 950° C., area A of FIG. 3. At these higher temperatures, it is theorized that the yttrium ions migrate to the foil surface along with the aluminum ions. However, the bulkier yttrium ions block the passageways in the oxide layer and thereby prevent the aluminum ion migration required to form the whiskers. The results are shown in FIG. 10. The peeled foil was oxidized for four hours in air at 975° C. The oxide layer is composed of slight nodules, mere hills in comparison to the mountainous whiskers in FIGS. 5 and 6. In comparison with the whisker-covered surface of this invention, the nodular oxide layer in FIG. 10 is too smooth to acceptably hold an applied ceramic coating, such as the preferred alumina coating.

Figure 11:
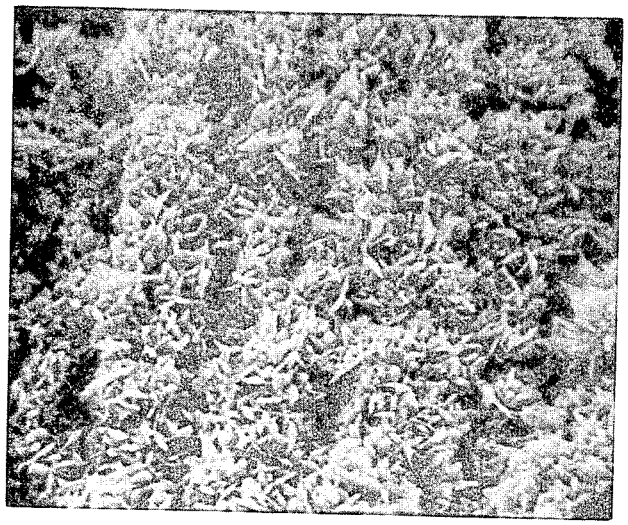
FIG. 11 is a photomicrograph taken using a scanning electron microscope and showing, at 5000× magnification, the oxide topography formed on the tensive surface of peeled Fe-Cr-Al-Y foil which was heated in air for four hours at 930° C.

Generally, the whiskers of this invention are suitably grown by oxidizing the peeled Fe-Cr-Al-Y foil at about 950° C. or less for a suitable time. Within this range, however, the specific temperature and time significantly affects the whisker growth. Oxidation at about 930° to about 950° C. produces the whisker growth shown in FIG. 11. The particular whiskers in FIG. 11 were formed on the compressive surface of peeled Fe-Cr-Al-Y foil by oxidizing in air at 930° C. for about four hours. The randomly oriented whiskers are clearly not as large or pronounced as the preferred whiskers in FIG. 5. Similar whisker growth is observed for oxidation temperatures less than about 870° and also generally for oxidation times less than about eight hours at temperatures between 870° and 930°. Thus, as shown graphically in FIG. 3, the whisker growth of the type in FIG. 11 is typical for the oxidation conditions represented by area B.

Figure 3:
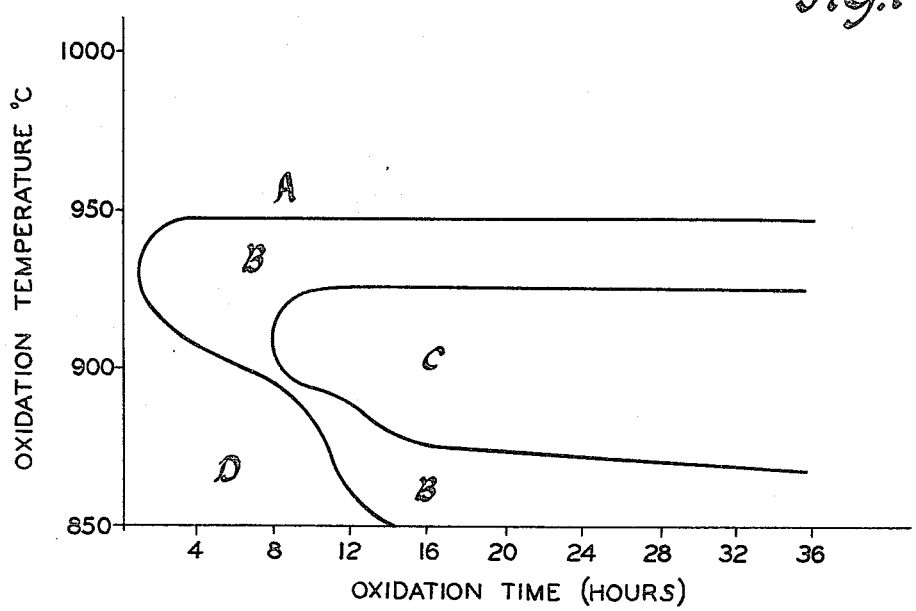
FIG. 3 is a graph of oxidation time versus oxidation temperature and showing regions for growing oxide whiskers in accordance with this invention.

The preferred whiskers are grown by oxidizing the foil between about 870° and 930° C. for greater than about eight hours, as represented generally by area C of FIG. 3. In the preferred embodiment, the foil was oxidized at 900° C. for twenty-four hours to grow the whiskers. As shown in FIG. 3, the preferred whiskers are also grown by heating the foil at about 925° C. for about eight hours. This reduces the processing time and the required furnace used and thereby provides significant advantages in production.

Figure 12:
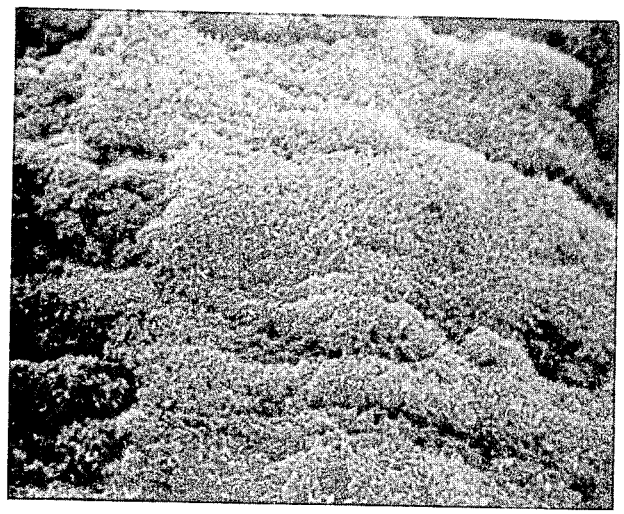
FIG. 12 is a photomicrograph made using a scanning electron microscope and showing, at 5000× magnification, the oxide formed on the tensive surface of Fe-Cr-Al-Y foil which was oxidized for four hours at 885° C. in air.

The oxidation conditions represented by area D produces a substantially flatter oxide shown in FIG. 12, wherein the compressive foil surface was particularly oxidized for four hours in air at about 885° C. This oxide growth is too smooth to provide the improved adhesion provided by the preferred oxide whiskers of this invention.

The alloy composition also affects the whisker growth. As mentioned hereinabove, for the preferred yttrium-containing alloy, whiskers do not grow at temperatures greater than about 950° C. This is not considered disadvantageous, since the alloy also exhibits good high temperature oxidation resistance resulting from the role of yttrium in inhibiting the continued formation of aluminum oxide. Therefore, this combination of a whisker-covered surface and high temperature oxidation resistance renders the Fe-Cr-Al-Y alloy well-suited to automotive catalytic converter use. Indeed, the volcanic growth of the whiskers of this invention on the preferred Fe-Cr-Al-Y foil is considered surprising in view of the alloy's very good oxidation resistance.

Ferritic stainless steel alloys containing aluminum, but no yttrium, are also suitably peeled and treated to form a foil substantially covered with alumina whiskers. For example, a suitable yttrium-free alloy consists of about 22.5 weight percent chromium, about 5.5 weight percent aluminum and the balance iron. Because of the compositional differences between this alloy and the preferred yttrium-containing alloy, the optimum whisker-growing conditions are believed to vary slightly. Good whisker growth, such as depicted in FIGS. 5 and 6, is believed formed by heating in air at a temperature between about 870° C. and about 970° C. Growing times of about four hours or longer are required at about 950° C., with longer times up to about twenty-four hours required at the lower temperatures near 870° C. Suitable whisker growth, such as depicted in FIG. 11, is produced by heating at a temperature between about 990° to 850° C. or lower for 0.5 hour or longer. The longer times are typically required at the lower temperatures. It is noted that higher growing temperatures than 950° C. are found in the absence of yttrium. It is also believed that variation in the aluminum or chromium content may also alter the whisker growing conditions. However, no whisker growth has been observed or is believed to occur at growing temperatures of 1000° C. or higher.

Although in the described embodiments a method for manufacturing the catalytic converter comprises forming a foil by a matal peeling process, it is apparent that other types of foils having the densely spaced oxide whiskers of this invention are suitable for this purpose. In general, this invention provides a substrate comprising an aluminum-containing ferritic stainless steel alloy having a surface that is substantially covered by oxide whiskers. Preferably, the substrate is a foil formed of a stainless steel containing chromium, aluminum and optionally yttrium. A coating is suitably applied to the whisker-covered surface and penetrates between the whiskers so as to become tightly bonded to the substrate.

In the preferred embodiment, the whisker-covered foil is utilized in the construction of a particular monolith-type catalytic converter for treating automotive exhaust gas. However, it is apparent that whisker-covered foil has other suitable uses. For example, the foil may be suitable for use for absorbing solar energy. As mentioned hereinabove, when a gold coating is applied to the preferred whisker-covered foil, the resulting foil appears black. This indicates a high absorption of light in the visible range. Thus, when the whisker-covered foil is exposed to the sunlight, the absorbed light efficiently heats the foil, which, in turn, may be used to suitably heat a working fluid.

Although this invention has been described in terms of certain embodiments thereof, it is not intended that it be limited to the above description but rather only to the extent set forth in the claims that follows.

The embodiments of the invention in which an exclusive property or privilege is claimed are defined as follows:

1. A method of forming a metal foil of an aluminum-containing ferritic stainless steel alloy having densely spaced oxide whiskers on a surface thereof, said method comprising
    forming by a metal peeling process a severely worked foil having an irregular surface, and
    heating the peeled foil in an oxygen-containing gas at a temperature and for a time sufficient to form said oxide whiskers on said surface.

2. A method of forming a metal foil of a ferritic stainless steel alloy containing 15 to 25 weight percent Cr, 3 to 6 weight percent Al, optionally 0.3 to 1.0 weight percent Y and the balance Fe, said foil having densely spaced oxide whiskers on a surface thereof, said method comprising
    forming by metal peeling a severely cold-worked foil having an irregular surface, and
    heating the peeled foil in air to a suitable temperature of between about 870° and about 970° C. for Y-free alloys or between about 870° C. and about 930° C. for Y-containing alloys for a time sufficient to grow said oxide whiskers on said surface.

3. A method of growing densely spaced oxide whiskers on a surface of a metal foil of a ferritic stainless steel alloy consisting essentially of 15 to 25 weight percent Cr, 3 to 6 weight percet Al, 0.3 to 1 weight percent Y and the balance Fe, said method comprising
    metal peeling the alloy to form a severely worked foil having an irregular surface, and
    heating the peeled foil in air to a temperature of between about 870° C. and about 930° C. for a time sufficient to grow said oxide whiskers on said surface.

4. A method of preparing a metal foil surface to receive a coating, said metal foil comprising a ferritic stainless steel alloy containing Al, said method comprising
    forming a metal foil from a cylindrical billet of said alloy by rotating the billet, peeling a continuous strip from the billet surface with a suitable cutting tool and pulling said strip away from the billet surface to form the foil, and
    heating the peeled foil in an oxygen-containing gas at a temperature and for a time sufficient to grow on a surface thereof oxide whiskers that substantially cover said foil surface and are capable of substantially improving the adhesion of a subsequently applied coating.

5. A method of preparing a metal foil surface to receive a coating, said metal foil being formed of a ferritic stainless steel alloy composed predominantly of iron and comprising 15 to 25 weight percent Cr and 3 to 6 weight percent Al, said method comprising
    forming a severely cold-worked metal foil from a cylindrical billet of said alloy by rotating the billet, peeling a continuous strip from the billet surface with a suitable cutting tool and pulling said strip away from the billet surface to form the foil, said foil having an irregular surface, and
    heating the peeled foil in air at a suitable temperature between about 870° C. for a time sufficient to grow on the foil surface high aspect ratio alumina whiskers that substantially cover said foil surface and are capable of substantially improving the adhesion of a subsequently applied coating.

6. A method of preparing a metal foil surface to receive a coating, said metal foil being formed of a ferritic stainless steel alloy consisting of 15 to 25 weight percent Cr, 3 to 6 weight percent Al, 0.3 to 1.0 weight percent Y and the balance Fe, said method comprising
    forming a severely cold-worked metal foil from a cylindrical billet of said alloy by rotating the billet, peeling a continuous strip from the billet surface with a suitable cutting tool and pulling said strip away from the billet surface to form the foil, said foil having an irregular and severaly worked surface, and heating the peeled foil in air at a temperature between about 870° C. and about 930° C. for at least eight hours to grow on the foil surface alumina whiskers on the order of 3 microns high that substantially cover said foil surface and are capable of substantially improving the adhesion of a subsequently applied coating to the metal foil.

7. A peeled metal foil formed of a ferritic stainless steel alloy containing Al and having a surface that is substantially covered by densely spaced alumina whiskers.

8. A peeled metal foil formed of a ferritic stainless steel alloy composed predominantly of iron and containing 15 to 25 weight percent Cr and 3 to 6 weight percent Al, said foil having a surface that is substantially covered by alumina whiskers.

9. A metal foil formed by a metal peeling process of a ferritic stainless steel alloy consisting of 15 to 25 weight percent Cr, 3 to 6 weight percent Al, 0.3 to 1.0 weight percent Y and the balance Fe, said foil having a surface that is substantially covered by high aspect ratio alumina whiskers.

10. In a monolith-type catalytic converter of the type suitable for the high temperature treatment of automotive exhaust gases, said converter comprising a structural member comprising a metal foil and having gas-conveying passageways therethrough, said foil being composed of an Al-containing ferritic stainless steel alloy and carrying a catalyst-impregnated alumina coating, the improvement wherein the foil comprises peeled metal foil having an oxidized surface that is formed of and substantially covered by densely spaced oxide whiskers, and the coating is applied onto said oxide whiskers thereby improving adhesion of said coating to said foil.

11. In a monolith-type catalytic converter of the type suitable for the high temperature treatment of automotive exhaust gases, said converter comprising a structural member having gas-conveying passageways therethrough and comprising a metal foil carrying a catalyst-impregnated alumina coating, said foil being composed of a ferritic stainless steel alloy comprising 15 to 25 weight percent Cr, 3 to 6 weight percent Al, and predominantly Fe, the improvement wherein the foil comprises peeled metal foil having a surface that is substantially covered by densely spaced, high aspect ratio alumina whiskers, and the coating adheres to said alumina whiskers thereby improving the adhesion of said coating to said foil.

12. A method of manufacturing a coated metal structural member comprising, providing a substrate comprising an Al-containing ferritic stainless steel alloy and having an oxidized surface that is substantially covered by oxide whiskers, and applying to the whisker-covered surface a coating that penetrates between the whiskers and thereby becomes tightly bonded to the substrate.

13. A method of manufacturing a catalytically coated metal foil structural member, said method comprising, providing a foil substrate comprising a ferritic stainless steel alloy containing 15 to 25 weight percent Cr, 3 to 6 weight percent Al, optionally 0.3 to 1.0 weight percent Y and the balance Fe, and having an oxidized foil surface comprising densely spaced oxide whiskers, said substrate being formable into the desired shape of the structural member, applying a coating comprising gamma alumina to the whisker-covered surface, and impregnating said alumina coating with a catalyst to form a spall-resistant, catalytically coated foil that is formable into the desired structural member.

14. A method of manufacturing a monolith-type catalytic converter suitable for the high temperature treatment of automotive exhaust gases and comprising a wound foil structural member having gas-conveying passageways therethrough, said method comprising, peeling a severely cold-worked metal foil from a billet of a ferritic stainless steel alloy containing 15 to 25 weight percent Cr, 3 to 6 weight percent Al, 0.3 to 1.0 weight percent Y and the balance Fe, annealing said peeled foil in air, forming a desired structural member shape by corrugating and winding said annealed peeled foil, heating the foil in air at a suitable temperature between about 870° C. to about 930° C. for a time sufficient to grow on a surface thereof high aspect ratio alumina whiskers that substantially cover said surface, applying to the whisker-covered surface a primer coat comprising of an aqueous alumina gel, coating said foil with a spall-resistant gamma alumina layer by applying to the primed surface at least one coat of a material comprising gamma alumina particles suspended in the aqueous alumina gel and drying, impregnating said alumina layer with an aqueous solution containing soluble noble metal salts, and reducing the noble metals to their catalytically active elemental state.

15. A metal foil formed of a ferritic stainless steel alloy containing aluminum and having a surface that is substantially covered by densely spaced alumina whiskers.

16. A catalyst-bearing structure for treating gases brought into contact with the surface thereof, said structure comprising a metal foil composed of an aluminum-containing ferritic stainless steel alloy and having an oxidized surface comprising densely spaced oxide whiskers, and a coating overlying the oxide whisker surface and tightly bonded to the foil by said whiskers, said coating comprising a gas-treating catalyst.

17. A catalytic converter for the treatment of automotive exhaust gases and comprising a foil structural member having gas-conveying passageways therethrough, said member comprising an aluminum-containing ferritic stainless steel alloy foil having a surface that is substantially covered by densely spaced oxide whiskers, and a catalyst-bearing coating overlying the oxide whisker surface, whereby said whiskers improve adhesion of said coating to said foil.

18. A catalytic converter suitable for treating of automotive exhaust gases, said converter comprising a wound foil member having gas-conveying passageways therethrough and comprising a metal foil composed of a ferritic stainless steel alloy comprising 15 to 25 weight percent Cr, 3 to 6 weight percent Al, optionally 0.3 to 1.0 weight percent Y and the balance Fe, said foil having an oxidized surface that is substantially covered by densely spaced, high aspect ratio alumina whiskers, and a catalyst-impregnated alumina coating applied to said whisker-covered surface and tightly bonded to the foil by the whiskers.

19. A metal foil formed of a ferritic stainless steel alloy containing aluminum and having an oxidized surface comprising densely spaced whiskers and suitable for receiving and tightly bonding an applied coating.

20. A metal foil formed of a ferritic stainless steel alloy containing aluminum and having an oxidized surface that is formed of and substantially covered by densely spaced whiskers on the order of 3 microns high.

21. A method of manufacturing a monolith-type catalytic converter suitable for the high temperature treatment of automotive exhaust gases and comprising a wound foil structural member having gas-conveying passageways therethrough, said method comprising, peeling a severely cold-worked metal foil from a billet of a ferritic stainless steel alloy containing predominantly 15 to 25 weight percent Cr and 3 to 6 weight percent Al, said foil having an irregular and severely worked surface, annealing said peeled foil in air, forming a desired structural member shape by corrugating and winding said annealed peeled foil, heating the foil in air at a suitable temperature between about 870° C. to about 930° C. for a time sufficient to grow on a surface thereof high aspect ratio alumina whiskers that substantially cover said surface, applying to the whisker-covered surface a primer coat comprising an aqueous alumina gel, coating said foil with a spall-resistant gamma alumina layer by applying to the primed surface at least one coat of a material comprising gamma alumina particles suspended in the aqueous alumina gel and drying, impregnating said alumina layer with an aqueous solution containing soluble noble metal salts, and reducing the noble metals to their catalytically active elemental state.

* * * * *

UNITED STATES PATENT AND TRADEMARK OFFICE
CERTIFICATE OF CORRECTION

PATENT NO. : 4,331,631
DATED : May 25, 1982
INVENTOR(S) : Lloyd R. Chapman, Charles W. Vigor, John F. Watton It is certified that error appears in the above—identified patent and that said Letters Patent is hereby corrected as shown below:

Column 3, line 10, "whiskers" should read -- whisker --.

Column 3, line 43, "whiskers" should read -- whisker --.

Column 4, line 47, "monolithtype" should read -- monolith-type --.

Column 5, line 23, "whiskercovered" should read -- whisker-covered --.

Column 7, line 23, after "coiled", "is" should read -- in --

Column 11, line 30, "matal" should read -- metal --.

Column 12, line 55, after "870°C", insert -- and about 970°C --.

Signed and Sealed this

Eighteenth Day of January 1983

[SEAL]

Attest:

GERALD J. MOSSINGHOFF

Attesting Officer   Commissioner of Patents and Trademarks